United States Patent [19]

van Mastrigt

[11] 4,171,640
[45] Oct. 23, 1979

[54] TENSION MEASURING DEVICE

[75] Inventor: Max van Mastrigt, Tarzana, Calif.

[73] Assignee: W. C. Dillon and Company, Inc., Van Nuys, Calif.

[21] Appl. No.: 906,151

[22] Filed: May 16, 1978

[51] Int. Cl.² ............................................. G01L 5/04
[52] U.S. Cl. ..................................................... 73/144
[58] Field of Search ........................................ 73/144

[56] References Cited

U.S. PATENT DOCUMENTS

| 2,118,727 | 5/1938 | Hanes | 73/144 |
| 3,177,708 | 4/1965 | Saxl | 73/144 |

FOREIGN PATENT DOCUMENTS 1086321  10/1967  United Kingdom ....................... 73/144

Primary Examiner—Charles A. Ruehl
Attorney, Agent, or Firm—Ralph B. Pastoriza

[57] ABSTRACT

The device provides an indication of the tension in a rope or cable and includes a rigid frame mounting first and second guide pulleys at opposite ends in tandem relationship. A central pulley is provided in the frame and the rope or cable is passed under the first guide pulley, over the central pulley and thence under the second guide pulley. The entrance and exit angle of the rope or cable over the central pulley is an angle less than 180° so that when a tension is placed on the rope, a downward force is exerted on the central pulley which force in turn is measured by a load cell to provide an indication of the tension in the rope. A manually operable locking and releasing structure cooperates with the mounting means for the first and second guide pulleys in such a manner as to enable simple manual removal of the guide pulleys from the frame so that the rope or cable can be positioned in the device without having access to the ends of the rope.

6 Claims, 5 Drawing Figures

TENSION MEASURING DEVICE

This invention relates generally to tension measuring devices or line tensiometers, and more particularly to an improved device for measuring tension in a rope or cable wherein the device can be attached to the rope or cable without need of access to the ends of the rope.

BACKGROUND OF THE INVENTION

Tension measuring devices or, as they are commonly referred to in the art, line tensiometers, function to provide a continuous measure of the tension in a rope or cable or any equivalent line such as might be used in a derrick, hoist, crane or similar structure. The measured tension will provide an indication of the load or weight being lifted and it is important in such operations to monitor carefully the line tension to avoid overloading of the structure and possible breaking of the supporting line. For convenience in terminology, the cable, line or rope involved will hereafter simply be referred to as a rope, it being understood that any equivalent line, cable, chain or the like could be substituted.

Many presently available tension measuring devices or line tensiometers comprise essentially three pulleys or sheaves mounted in tandem relationship. The outer pulleys constitute first and second guide pulleys and the central pulley constitutes a force responsive element. By threading a rope under the first guide pulley, over the central pulley and thence under the second guide pulley and by so positioning the pulleys that the entrance and exit angle of the rope over the central guide pulley forms an angle less than 180°, it will be appreciated that a tension on the line will exert a downward force on the central pulley; that is, a force on the pulley in a direction tending to move the rope into a straight line. This force can be measured and calibrated to indicate the tension in the line by an appropriate load cell transducing means responsive to the force exerted on the central pulley.

The major problem with all tension measuring devices of the foregoing type is that the rope involved must be threaded through the device, one end of the rope first being passed under the first guide pulley, thence over the central pulley, and thence under the second guide pulley. In other words, access must be had to at least one end of the rope thereby necessitating disconnection of this end from a crane or other structure. While it is possible to design certain tension measuring devices in such a manner that the same can be attached to a rope without access to the ends, the modified designs in question involve a major alteration of the basic principle involved in measuring the force. It would be highly desirable if presently available standard tension measuring devices such as described heretofore could be modified in some simple manner without involving a great deal of expense to permit their use on ropes without requiring access to one or both ends of the rope in attaching the devices.

BRIEF DESCRIPTION OF THE PRESENT INVENTION

Bearing the foregoing in mind, the present invention contemplates an improved tension measuring device which operates on the principle of known standard devices and which utilizes the major components of such standard devices with only slight modification such that the device can readily be attached to or removed from a cable or rope in which tension is to be measured without need of access to one or both ends of the rope.

Briefly, in accord with the present invention, the tension measuring device includes a frame means rotatably mounting first and second guide pulleys in tandem relationship at opposite ends, and a central pulley therebetween. Indicating means are provided responsive to a force exerted on the central pulley when a rope positioned in the device extends under the first guide pulley, over the central pulley and under the second guide pulley, is placed under tension. Means are provided at the opposite ends of the frame for permitting manual removal of the guide pulleys from the frame means so that the rope can be positioned in the device without access to the ends of the rope.

The foregoing means at the opposite ends of the frame means involves only minor modifications of a conventional tension measuring device frame so that the devices of the present invention can be manufactured with only a minimum of changes in the manufacturing equipment; or, alternatively, presently available devices can readily be modified to provide the improved device of the present invention.

BRIEF DESCRIPTION OF THE DRAWINGS

A better understanding of this invention will be had by now referring to a preferred embodiment thereof as illustrated in the accompanying drawings in which.

DETAILED DESCRIPTION OF THE PREFERRED EMBODIMENT

Figure 1:
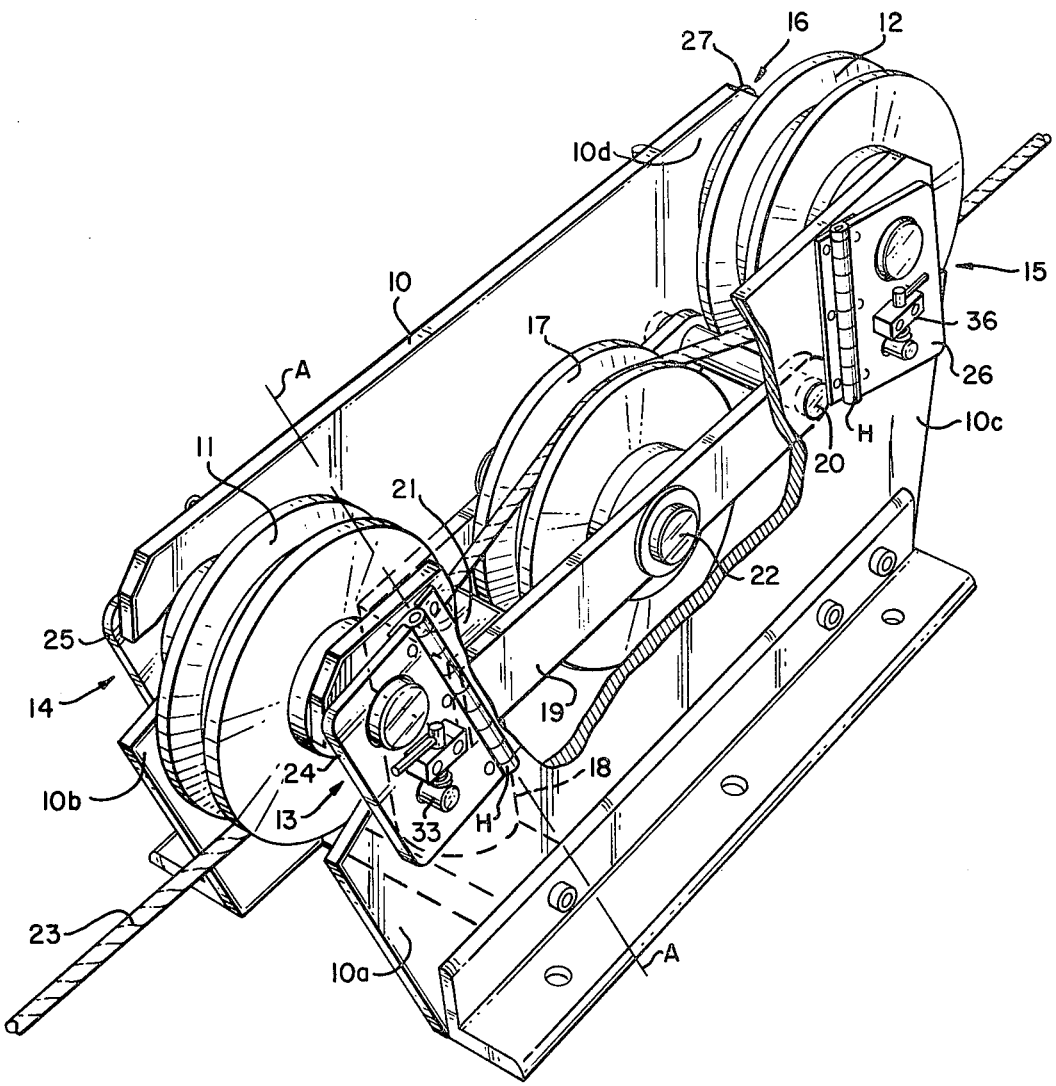
FIG. 1 is a perspective view partly cut away of the tension measuring device of this invention.

Referring first to FIG. 1, the tension measuring device includes a rigid frame 10 with first and second guide pulleys 11 and 12. Mounting means designated generally by the numerals 13, 14, 15 and 16 rotatably mount the first and second guide pulleys in tandem relationship at opposite ends of the frame 10 respectively.

A central pulley shown at 17 is disposed between the first and second guide pulleys 11 and 12 in tandem relationship. As will become clearer as the description proceeds, there is provided a load cell 18 shown partly in phantom lines secured to the frame 10 lying in the plane of the pulleys between the central pulley 17 and first guide pulley 11. A lever structure 19 has a first end pivoted as at 20 to the frame 10 at a point between the central pulley and the second guide pulley 12 to act as a fulcrum. A second end of the lever structure indicated in phantom lines at 21 engages the load cell 18. The central pulley 17 in turn is rotatably mounted to the lever structure at a point 22 intermediate the first and second ends 20 and 21 of the lever structure.

Further shown in FIG. 1 is a rope 23 passing under the first guide pulley 11, over the central pulley 17 and under the second guide pulley 12. The positioning of the central pulley 17 with respect to the first and second guide pulleys 11 and 12 is such that the entrance and exit portions of the rope 23 passing over the central pulley 17 form an angle less than 180°.

The structure of FIG. 1 is completed by the provision of appropriate means at the opposite ends of the frame for permitting manual removal of the guide pulleys 11 and 12 from the frame 10 so that the rope can be positioned in the device without access to the ends of the rope. As will become clearer as the description proceeds, these means take the form of movable plates 24, 25, 26 and 27 secured to outer end portions of the frame.

Figure 2:
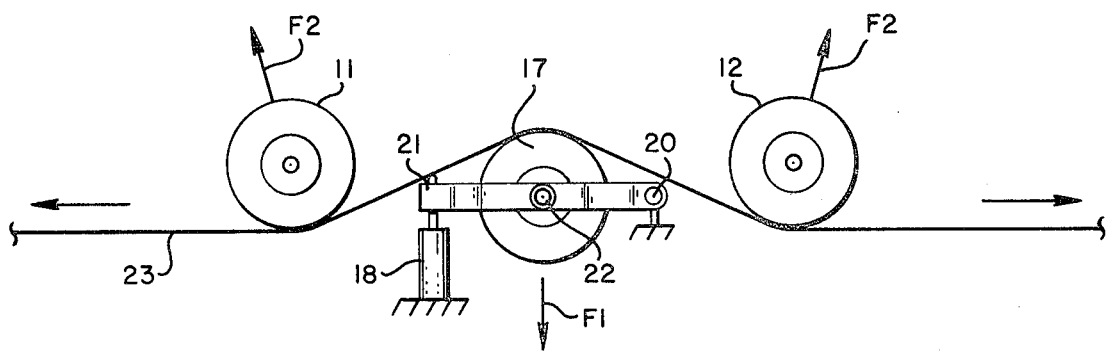
FIG. 2 is a side view illustrating basic components in schematic form useful in explaining the principle of operation of the tension measuring device.

Referring now to FIG. 2, there is schematically depicted the basic components of the tension measuring device described in FIG. 1 in schematic form wherein it will be evident that when a tension is applied in the rope 23, there will be a downward force F1 exerted on the central pulley 17. This force is transmitted to the lever structure and because of the pivoting arrangement at the first lever end 20, a force will be applied at the second lever end 21 against the load cell 18. Appropriate strain gauges provided on the load cell 18 will thus provide an output electrical signal constituting a function of the force F1 and thus the tension in the rope.

It will be understood in FIG. 2 that reaction forces designated F2 will be exerted on each of the first and second guide pulleys 11 and 12 in the directions indicated. These guide pulleys, however, are securely mounted to the rigid frame 10 and thus are locked against any movement in translation. It will be noted that the direction of the reaction forces F2 are directed upwardly and outwardly, the direction being defined by a straight line passing through the tangent point of the rope 23 on the guide pulley and the center of the guide pulley.

The mounting means and means permitting removal of the guide pulleys are the same for each of the pulleys, the end structures on either side of each pulley being essentially mirror images of each other. Accordingly, a detailed description of the mounting arrangement for the pulley 11 will suffice for both pulleys.

Figure 3:
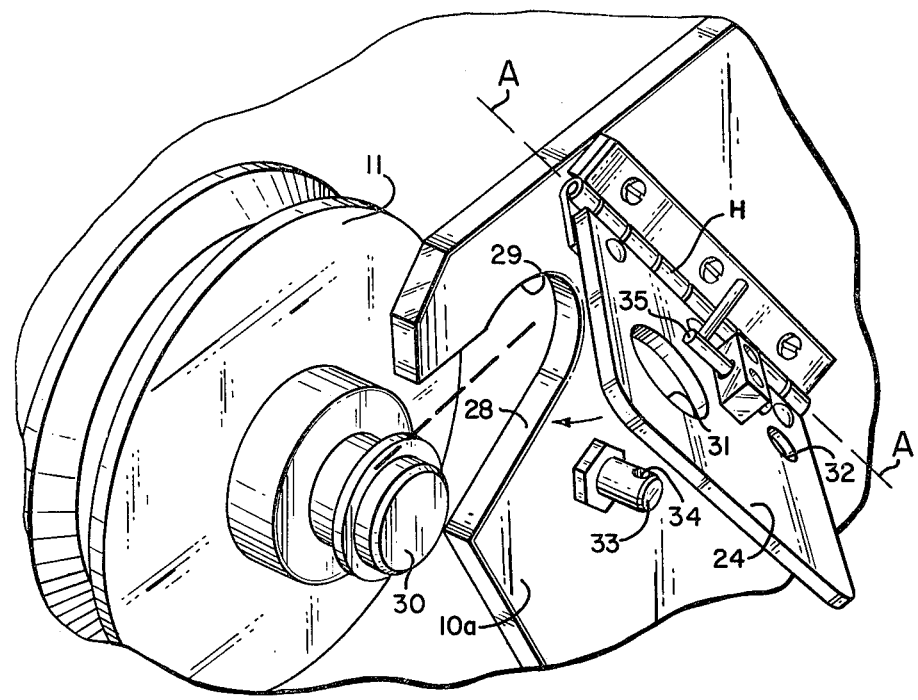
FIG. 3 is a greatly enlarged fragmentary perspective view of one end portion of the device of FIG. 1.

Thus with particular reference to FIG. 3 it will be noted that each opposite end of the frame includes spaced parallel end members 10a and 10b. Each of these members has a slot such as indicated at 28 extending inwardly from the end of the member and terminating in axially aligned circular journal openings such as indicated at 29. These journal openings define the mounting means for the guide pulleys and in this respect, each of the guide pulleys such as the pulley 11 is provided with extending hubs such as the hub 30, respectively receivable in the journalling opening 29. With this arrangement, it will be evident that the pulleys can readily be received in or removed from the journalling openings by way of the slots such as the slot 28.

The referred to means permitting the removal constitute essentially manually operable securing means in the form of the referred to retaining plates such as the plate 24. This plate is movable and in the preferred embodiment is hinged for rotating movement to the exterior of the end member 10a as shown at H. Swinging movement of this plate takes place about a given axis A—A which lies in a plane normal to the axis of the journal openings 29. The arrangement is such that the plate can swing between an open position as illustrated in FIG. 3 to a retaining closed position against the outer surface of the end member 10a to overlie the slot 28 in this member.

Still referring to FIG. 3, it will be noted that the plate 24 is provided with a hub receiving opening 31 positioned to register with the journal opening 29 when the plate is in its retaining closed position. In addition, the plate 24 includes a separate locking opening 32 spaced from the hub opening 31 for cooperation with an outwardly extending projection 33 from the end member 10a. This extending projection 33 will be received through the locking opening 32 when the plate 24 is swung to its retaining closed position.

Still referring to FIG. 3, it will be noted that the projection 33 includes a radial hole 34 in its extending end. This hole cooperates with a latch means in the form of a rod 35 arranged to move up and down on the outside of the plate 24 so that its end can be received in or removed from the hole 34 in the projection 33 to thereby retain the plate 24 in its closed position.

Figure 4:
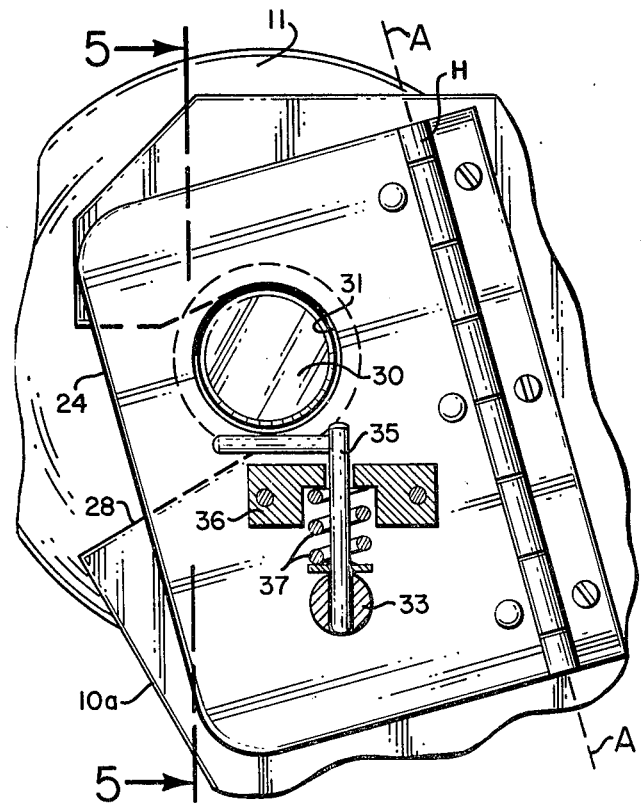
FIG. 4 is a fragmentary elevational side view partly in cross section of the one end of the device of FIG. 1; and, FIG. 5 is a fragmentary cross section taken in the direction of the arrows 5—5 of FIG. 4.

The foregoing will be more evident by referring now to FIG. 4 which shows the plate 24 in its closed position wherein it will be noted that the end portion of the hub 30 is received through the hub receiving opening 31 in the plate 24. Further, the latch rod 35 is shown with its lower end received in the extending projection 33 to thereby secure the plate in its closed position. In this respect, there is provided a guide block 36 secured to the exterior of the plate 24 as shown in FIG. 4, the latch rod 35 passing through the block 36. A spring 37 is positioned as shown to bias the rod 35 in a direction towards the hole in the extending projection 33 so that a positive manual lifting force is required on the latch rod 35 to free it from the projection 33.

Figure 5:
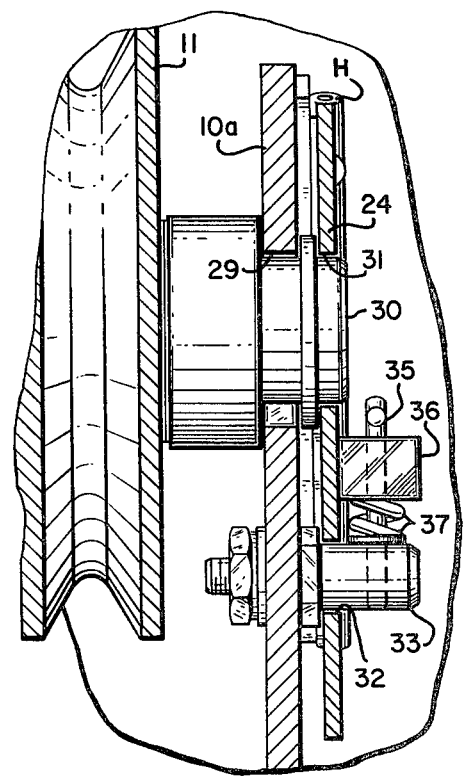

FIG. 5 further illustrates the relative positioning of the components illustrated in FIG. 4 wherein it will be clearly evident that the hub 30 for the guide pulley is securely held within the journal opening 29 by the plate 24. In FIG. 5, the parts described in FIGS. 3 and 4 are designated by the corresponding numerals.

It will be noted in both FIGS. 1, 3 and 4 that the hinge axis A—A for the hinge H supporting the plate 24 forms an angle with the vertical; that is, it extends generally upwardly and outwardly. This angulation of the hinge axis is purposely made to position the hinge axis so that it is precisely parallel to the reaction forces F2 described in FIG. 2 exerted on the guide pulleys. By positioning the hinge axis in this direction, there will not be generated any force component which would tend to swing the plate 24 about the hinge axis since all forces exerted on the hinge axis will be along the direction of the axis.

OPERATION

The operation of the device of this invention will be readily evident from the foregoing description. In initially using the device, the various latch rods such as indicated at 35 in FIG. 4 are simply manually raised so that the plates such as plate 24 can be swung open about their hinge axes thereby opening up the slot such as the slot 28 and permitting removal of the corresponding guide pulley. A rope can then simply be positioned over the central pulley 17 as shown in FIG. 1 and then the respective first and second guide pulleys 11 and 12 positioned on top of the extending ends of the rope 23 and the pulley hubs received within the slots. The plates corresponding to plate 24 are then swung closed against the outer surfaces of the end members of the frame to effectively close the slot, the hub end portions of the pulleys being received through the hub receiving openings such as the opening 31 in the plates. Securement of the plates in their closed positions is then achieved by releasing the latch rod 35 so that its lower end enters the hole in the extending projection 33, this extending projection in turn having passed through the locking opening 32 in each of the plates.

After the foregoing procedure has been completed, the rope is properly positioned in the device so that measurements can be made of the tension in the rope in the usual manner.

A reverse of the foregoing procedure permits easy removal of the device from the rope without requiring access to the ends of the rope.

As mentioned heretofore, the structural design of the mounting means and means permitting removal of the guide pulleys is such that it is very simple to modify existing tension measuring devices. More particularly, it is only necessary to cut the slots such as the slot 28 in the end members of the frame and then attach the plates 24 to the outer surfaces of these members. The remaining components of the device do not require any modification and the principle of operation is not in any way changed.

From all of the foregoing, it will thus be evident that the present invention has provided a greatly improved tension measuring device or line tensiometer which overcomes the problem of affixing many of the presently available devices to a rope or cable wherein prior to the present invention, access to one or both ends of the cable was necessary.

I claim:

1. A tension measuring device for providing an indication of the tension in a rope including, in combination:
   (a) frame means rotatably mounting first and second guide pulleys in tandem relationship at opposite ends and a central pulley therebetween, said guide pulleys having axially extending hubs and said frame means having end slot openings in each opposite end for receiving the pulley hubs;
   (b) indicating means responsive to a force exerted on said central pulley when a rope positioned in the device under the first guide pulley, over the central pulley and under the second guide pulley, is placed under tension; and
   (c) retaining plates movably mounted on said opposite ends of the frame means from an open position away from said slots so that the guide pulleys can be manually removed and reinserted therein to a closed position overlying said slots to block removal of said pulley hubs from the slots, thereby permitting manual removal of said guide pulleys from the frame means so that said rope can be positioned in said device without access to the ends of the rope.

2. A device according to claim 1, including latch means on said frame means and plates for latching said plates in their closed positions.

3. A tension measuring device for providing an indication of the tension in a rope including, in combination:
   (a) a rigid frame;
   (b) first and second guide pulleys;
   (c) mounting means at opposite ends of said frame for rotatably mounting said first and second guide pulleys in tandem relationship at said opposite ends respectively;
   (d) a central pulley disposed between said first and second guide pulleys and lying in the same plane;
   (e) a load cell secured to said frame lying in the plane between said central pulley and said first guide pulley;
   (f) a lever structure having a first end pivoted to said frame at a point between said central pulley and said second guide pulley to act as a fulcrum, and a second end engaging said load cell, said central pulley being rotatably mounted to said lever structure at a point intermediate its first and second ends such that a rope passing under said first guide pulley thence over said central pulley and under said second guide pulley exerts a force on said central pulley when under tension in a direction to apply force at the second end of said lever structure on said load cell; and
   (g) manually operable securing means cooperating with said mounting means to enable removal of said first and second guide pulleys from said frame so that said rope can be positioned to pass under the guide pulleys and over the central pulley without having access to the ends of said rope.

4. A device according to claim 3, in which each opposite end of said frame includes spaced parallel end members having slots extending inwardly from the ends of the members and terminating in axially aligned circular journal openings defining said mounting means, each of said guide pulleys having axial hubs receivable through said slots to seat in said journal openings so that the pulleys can be removed or inserted in the journal openings by way of said slots; said manually operable securing means including a retaining plate hinged to the exterior of each of said end members for swinging movement about a given axis in a plane normal to the axis of the journal opening between an open position and a closed retaining position against the outer surface of the end member to overlie the slot in the member, said plate having a hub receiving opening positioned to register with the journal opening in the member when the plate is in said closed retaining position, and a separate locking opening spaced from said hub receiving opening, said member including an outwardly extending projection receivable through said locking opening when said plate is in its closed retaining position against the outer surface of said member, said projection having a radially directed hole in its extending end, and a latching rod mounted on the outer surface of said retaining plate for movement into and out of said hole in said extending projection to thereby secure said retaining plate in its closed retaining position when in said hole and release said plate when out of said hole so that said plate can be swung to its open position whereby each of the retaining plates may be swung to their open positions to permit manual removal of the guide pulleys from the slots so that the rope can be passed under the guide pulleys and over the central pulley, the guide pulleys then being replaceable through the slots and the plates swung to their closed retaining positions wherein the guide pulley hubs are received in the hub receiving openings of the plates and blocked against movement out said slots by said plates, said plates being retained in their closed positions by insertion of said rods in the holes of said extending projections.

5. A device according to claim 4, in which the given axis of swinging movement of said plate is parallel to the direction of force exerted on the associated guide pulley resulting from tension in the rope.

6. A device according to claim 5, including spring means biasing said rod towards said hole so that a positive lifting force is required to remove the rod from the hole to release the plate.

* * * * *